US006947909B1

(12) United States Patent
Hoke, Jr.

(10) Patent No.: US 6,947,909 B1
(45) Date of Patent: Sep. 20, 2005

(54) DISTRIBUTION, RECOGNITION AND ACCOUNTABILITY SYSTEM FOR INTELLECTUAL AND COPY WRITTEN PROPERTIES IN DIGITAL MEDIA'S

(76) Inventor: Clare L. Hoke, Jr., 1318 N. Monte Vista Ave., Upland, CA (US) 91786

( * ) Notice: Subject to any disclaimer, the term of this patent is extended or adjusted under 35 U.S.C. 154(b) by 0 days.

(21) Appl. No.: 09/569,388

(22) Filed: May 12, 2000

(51) Int. Cl.[7] .......... G06F 17/60

(52) U.S. Cl. .......... 705/54; 705/50; 705/51; 705/52; 705/57; 705/58; 705/59

(58) Field of Search .......... 705/51, 54, 57; 713/153

(56) References Cited

U.S. PATENT DOCUMENTS

| | | | | | |
|---|---|---|---|---|---|
| 5,191,573 | A | | 3/1993 | Hair | |
| 5,715,314 | A | | 2/1998 | Payne | |
| 5,862,260 | A | * | 1/1999 | Rhoads | 382/232 |
| 5,926,796 | A | | 7/1999 | Walker | |
| 5,950,173 | A | | 9/1999 | Perkowski | |
| 5,960,411 | A | | 9/1999 | Hartman | |
| 6,289,341 | B1 | * | 9/2001 | Barney | 707/6 |
| 6,345,256 | B1 | * | 2/2002 | Milsted et al. | 705/1 |
| 6,389,403 | B1 | * | 5/2002 | Dorak, Jr. | 705/51 |
| 6,434,538 | B1 | * | 8/2002 | Ibaraki et al. | 705/57 |

FOREIGN PATENT DOCUMENTS

JP 2003202931 A * 7/2003 .......... G06F/1/00

OTHER PUBLICATIONS

Academic Press selects MediaDNA as online Distributor–Information Today, Feb. 1, 2000, v17 n2 p31–32, 2 Page (s)–ISSN 8755– 6286.*

* cited by examiner

*Primary Examiner*—James P. Trammell
*Assistant Examiner*—Daniel L. Greene

(57) ABSTRACT

A method for distribution, recognition and accountability for Intellectual and Copy written Properties in digital media's by associating a Transaction Code Identifier or Designator and further bundled information which distinguishes digital files as Intellectual or Copy written Property, and therefore unique and bound to restrictions with regard to transfer, ownership, proliferation and electronic commerce. The employment of said transaction code identifier further promotes novel distribution scenarios for electronic commerce. Further delineated is the role of network providers and servers in promoting the interests of owners of Intellectual and Copy written Property in accordance with the present invention.

19 Claims, 4 Drawing Sheets

DISTRIBUTION, RECOGNITION AND ACCOUNTABILITY SYSTEM FOR INTELLECTUAL AND COPY WRITTEN PROPERTIES IN DIGITAL MEDIA'S

FIELD OF INVENTION

The present invention represents a method of regulating e-commerce in the interest of protecting property such as information, art, performances or ideas which are copy written, licensed or patented. The present invention will be applied in recognition and making accountable of electronic transference of property via the Internet or other electronic medium.

HISTORY OF THE INVENTION

The world of electronic commerce and information distribution is rapidly changing. With the increasing use of electronic media for the transference of copy written property there has arisen a need to hold such transactions accountable to the property holder. Downloadable music such as Mp3 files are an example of a product seeking a market solution for accountability in the electronic realm. The present invention provides such a solution for the owners of property which may be traded in the electronic marketplace. The concern to the property owner is with receiving payment for the transfer of said property, when unaccounted for copies of the property are being distributed from individual to individual. As the velocity of computing power increases into the future, the ability to detect and record transactions of property across the electronic medias will be more readily enabled.

Patent law has not allowed its grasp to become stagnant in embracing the requirements of the virtual world. For this reason we now witness the consideration of business activities via. electronic mediums as novel, and companies are scrambling to posses the nuts and bolts of doing business in the cyber world. U.S. Pat. No. 5,960,411, Method and System for Placing a Purchase Order via a Communications Network" is an example of such recent developments, as is U.S. Pat. No. 5,191,573, Method for Transmitting a Desired Digital Video or Audio Signal", also U.S. Pat. No. 5,715, 314, "Network Sales System".

While these patents relate to business within electronic medium, US method of doing business U.S. Pat. No. 5,926, 796, "Method and Apparatus for Selling Subscriptions to Periodicals in a Retail Environment" and U.S. Pat. No. 5,950,173, "System and Method for Delivering Consumer Product Related information to Consumers Within Retail Environments using Internet-Based Information Servers and Sales Agents" hearken back to the retail environment as a resource to instigate beneficial commerce between multiple parties. The latter is particularly interesting and somewhat short sighted in that products may be referenced by the antiquated "UPC" system in collusion or in deference to web resource codes, rather than simply by HTML codes and URL identification exclusively, as may be the way of the future. URL's are unique identifiers, which are universally accepted and readily access more pertinent information than "UPC" codes.

The present invention is concerned with holding accountable the proliferation of copy written, or intellectual property via electronic mediums. Currently there are several suggested solutions to hold individuals, institutions and corporations accountable to intellectual or copy written proprietors. An example is the "Secure Digital Music Initiative", an organization which is soliciting suggestions to standardize a method of protection in coordination with producers of music, electronic hardware and electronic service organizations.

SUMMARY OF THE INVENTION

Certain elements must be present for a transaction of property in the form of digital data files to be held accountable in the electronic realm. Such property must be identifiable via. a particular coding to be recognized by Internet Providers, Network Providers and Internet servers world wide. Such a code could be in the form of a precursor, not unlike the universally recognized "http://" employed in the world wide web, or perhaps by property type, not unlike the .edu, .mil, .com, .org designations also employed in web addressing. Coding for the promotion of commerce in electronic media is herein referred to as a Transaction Code Identifier. Along with a Transaction Code Identifier further specific descriptors of the type of information contained in the file, the identity of the property owner, and the requirements to be agreed to by the recipient before the file is transferred may be bundled with the actual digital property file to make a copyw, or bundle which may be transferred as a whole via electronic medias. In the process of making a transaction, further information must be transferred between parties. There must be information on the purchaser, a method of payment and further information to provide security for both the purchaser and the purchasee. Transaction coding may be in the form of imbedded coding, interlaced within the actual product so as to make it difficult to remove the transaction related information. It is herein suggested that Transaction Code Identifiers may be identified by the word or coding ".copyw" as in www.copyw/hitsong.com or www.hitsong/copyw/uspto.gov, but the actual term used is not as significant as its intended function, and the present invention should not be limited by such manner.

That the property is prefaced by or bundled with a Transaction Code Identifier shall define a copy of said property as a proper copy. Proper copies of copy written properties will then be offered by servers to be downloaded to consumers via. electronic transference upon consent of the consumer to provide enumeration from an account under the control of the consumer. The proper copy of the property file may then be downloaded to the consumer for personal usage. Currently Intellectual or Copy written Properties are traded via. a single "manufacture", or through a small number of vendors who have license with the original supplier to be distributors. Upon the consumer seeking out a particular product, or viewing an online catalog, consumers may request further information on a product or instigate the ordering process. There are multiple scenarios and processes which occur at this point. The customer may make a request by clicking on a button, which calls a specific URL, or begins the process of downloading a JAVA program, which initiates the sales process by addressing the computational issues from the consumers computer. There are multiple security systems that are being used and proposed to make the process secure. However certain information must be transferred regarding the consumer and the supplier to effectively insure a successful transaction.

Pursuant to the present invention the Transaction Code Identifier (TCI) shall reside as a dormant aspect of the property file upon the consumers computer. Software shall specify that the code will neither be heard nor seen as part of the property file, and the code will not interfere with the function or enjoyment of the downloaded property.

When files are uploaded to a server as email or attachments the server will scan the transmission for Transaction Code Identifiers. Upon uploading, or in preparation of downloading to an addressee, if a transaction code is recognized the Server, Internet Provider (IP), or Network Provider (NP) will gate the transmission with regard to the proper copy of the property until the requirements of downloading are met by the recipient. If the transmission originates from a commercial source, the requirements of the downloading must also be met before commencing downloading. This arrangement shall place Servers, Internet Providers, and Network Providers in the position of monitoring data that is being transmitted through their systems. It will then become an issue for network servers to address the further proliferation of copies of properly formatted properties.

What is unique about the above delineation is that producers of intellectual property and consumers of intellectual property may be regarded equally by network servers. There are vendors of copy written material, and when consumers themselves proliferate copies of said copy written material, they are in effect defacto distributors of said copy written material. While the consideration given to the defacto distributors may be non monetary, i.e. in some way intrinsic or in other ways rewarding to the defacto distributors, before the property file is transferred by the server, the recipient must agree to become a consumer of the product, ie. they must agree to the terms specified to receive the download. Herein all transfers of intellectual or copy written property are held accountable via. Servers, IP's, NP's to the property holder, regardless of the originator of the transaction. It then becomes the position of the web servers to be responsive to the needs of property holders.

It is easy to see this relationship between property holders, IP's, NP's, defacto distributors and customers may be performed gratis by IP's, NP's, because commerce on the Internet is in the IP's, NP's best interest. However, it is also foreseeable that as the computational power, due diligence, or the task of keeping ahead of freeloaders becomes more burdensome, web servers may wish to establish themselves as technological resources, with research and programming platforms to offer for a price to property holders. It is further foreseeable that web servers may also make themselves statistically accountable to property holders. While it is understood that there will always be a percentage of freeloaders who succeed in evading the resources of property holders, IP's, NP's, and third parties interested in holding consumers accountable, particular IP's, NP's may choose to account for estimated losses and compensate property holders as guarantors of private property, in an attempt to increase the trafficking of properties through specific web servers.

In the preferred embodiment of present invention, IP's, NP's enter the marketplace as willing providers of accountability to intellectual and copy written property holders, whose property is transferred through their domains. The present invention changes the directionality and accountability previously associated with traditional methods of doing business. Previously there was a flow of accountability from manufacture, to distributor, to retailer, to consumer, to agents, which are ultimately responsive to the original manufacture to insure that theft at any level is avoided and accountability to the interests of the Intellectual or Copy written property holder is ultimately maintained. In the preferred embodiment of the present invention the directional flow of product and accountability is altered. All parties interested in the proliferation of Copy written or Intellectual property may be regarded as distributors. The act of distributing Intellectual or Copy written property may or may not be ultimately compensated by the property owner; but transfers will not occur from the domain of an IP, NP without meeting the requirements set forth by the owners of said Intellectual or Copy written Property.

The owner of a given Intellectual or Copy written Property (ICP), may establish distribution rights on several levels with numerous vendors. For example, music publisher M, may decide to have an ICP distributed through several web service organizations (WSO's). These web service organizations may have music web sites where customers shop for music. Customers may sample selections of music from a WSO's web sites before deciding to purchase downloads of proper copies of music. These WSO's will be able to effectively receive payment from the consumer, in accordance with the terms specified by the original property holder as delineated in the format of the proper copy, or the copyw of the property. IP's, NP's monitoring their domain see a properly formatted ICP and the transmission of the ICP is gated until the requirement of the ICP are met. After completing the transfer, the WSO's transfer the appropriate percentage of compensation to the ICP owner. IP's, NP's are in a position to receive encrypted verification from third parties involved in the transaction, including WSO's, that consideration in accordance with the terms specified by the original property holder as delineated in the format of the proper copy of the property has been accessed and accounted for. Web Servers witness that the requirements set forth in the proper copy were met before downloading the proper copy of any ICP to a consumer, and may further inform the ICP owner that a transaction has occurred. From the properties TCI, the requirements of legal transfer may be extracted by the involved Network or Internet service provider.

In a further embodiment of the present invention, after receiving indication that a properly formatted copy of a ICP is in position to be transferred within a Web Servers domain, the Web Server may then gate not only the transmission of the ICP but the financial transaction as well; seeing that the conditions of the terms embedded or contained with the ICP are met, the Web server may then receive payment from the customer, further distributing each portion of the payment received to all interested parties, ICP owner or distributor. In this embodiment of the present invention the relationship of the web server to the consumer is expanded to include that an account and further compensatory responsibilities exist between the Web Server and the consumer doing business within a particular Web Servers Domain.

In the preferred embodiment of the present invention multiple levels of distribution of ICP's are to be anticipated. In example, the consumer of the above scenario may decide to send a copy of music from publisher "M" to a friend. In this example Customer "C" sends an email with a recently purchased ICP music attachment to friend "F". Because the music is a proper copy of the ICP, the Web Server gates the transmission of the ICP music file until friend "F" agrees to become customer "F". In this instance customer "F" then must established accountability to the original ICP owner via the Web Server or through a third party with whom customer "F" has an account to insure payment in agreement with the terms specified by the proper copy of the ICP.

In the preferred embodiment of the present invention customer "C" has also downloaded with the music ICP a sampler program which assists customer "C" in further becoming a distributor of the music files from publisher "M". This program contains a sampler of the music customer "C" has downloaded. When customer "C" sends an email to friend "F", customer "C" may include the sample program, so that friend "F" may hear a sample of the music of publisher "M" before deciding to purchase the ICP. This sampler may reside on friend "F's" portable or remote device for a specified period of time or playbacks before the option of further playbacks is negated in accordance with the sample program. The proper copy of the ICP may also reside in the domain of the Web Server should friend "F" decide to become customer "F", or purchase information may simply reside upon friend "F's" remote device in the form of the sample program, or residual there of, ready to consummate the transaction from within or beyond friend "F's" Web Servers domain at the request of friend "F".

The present invention is fluid in its ability to adapt to market driven commerce. The above example may be employed to further illustrate this point. Should music publisher "M" realize that there is some potential in affiliation with small "distributors" such as customer "C", publisher "M" may provide incentives for small distributors to promote publisher "M's" music. Programs associated with properly formatted ICP's, or the records of transference within the domains of Web Servers may serve to establish rebates, spiffs, credits or compensation to sub distributors of properly formatted and notated ICP's.

The present invention is capable of encompassing multiple fields of commerce, and accommodating the requirements there of. The transactional needs of the broad spectrum of commodities represented by ICP's are vast. Samplers may work well for music, or software, but perhaps not for engineering or pharmaceutical ICP's. The requirements of transferring ICP's will also vary extensively in accordance with the demands of individual property holders. The preferred embodiment of the present invention is capable of addressing the requirements of specific ICP's and more. Large capital items may require negotiation in prefacing the consummation of a transaction. In this instance properly formatted ICP's may establish areas where property holders are negotiable, or regions of compensation, which may be adjusted in accordance with the particulars of buyers and sellers. Further, properly formatted ICP's may infer nothing more than floors from which negotiations may depart. An example of this type of transaction would include a potential consumer agreeing to a financial commitment in advance of downloading specific information required to arrive at a bargaining floor. In a similar variation of the above delineated process, the present invention may also be employed in instigating electronic auctions, whereby consumers first consider the resources being auctioned, and establish a secure relationship for the transfer of consideration, before arriving at an agreeable compensation for the transference of ICP's.

ICP's are often held by large entities, seeking to increase market shares and dominance, but the contribution of the individual ICP holder will not be denied in the social political, legal, and technological landscape of present and future ages. The present invention addresses this reality and facilitates a novel redistribution of distribution and accountability within our society. It is novel that by employing the present invention the depth and breath of commerce may expand exponentially while holding each transaction accountable to the interests of Intellectual and Copy written Property owners.

It was earlier argued that the employment of TCI's or URL addresses would become more useful to commerce than previously accepted techniques such as UPC codes. The author of the present invention believes that this will become apparent to anyone versed in the art of electronic commerce. While the present invention includes TCI's and web addresses as useful tools in holding all concerned parties accountable to the holders of ICP's, the present invention embraces other novel technologies in securing the interests of property owners. ICP's are defined as unique and identifiable both inside and outside the domain of electronic commerce. The uniqueness of every Intellectual or Copy Written Property is in itself a signature, which is addressable within the domains of commerce, real and virtual. Within the digital domain, it may easily be fathomed by those versed in the art of electronic commerce that due to increases in computational power, speed and bandwidth, Intellectual or Copy Written Properties themselves will become recognizable to programs designed to identify ICP's against libraries of registered ICP's. As more of the worlds resources are digitized, referenced, cataloged and transferred within an expanding digital infrastructure there comes the ability to recognize the signature of an individual ICP, both part and whole. In like manner transfers of digital information may be scrutinized against digital reference libraries to insure that no transfers include improperly formatted ICP's: and transactions as well as transfers may be reviewed, either sectionally or in entirety. It is herein suggested that in accordance with the consent of ICP holders, IP's, NP's may also in their own best interest, come to sample the content of transactions being transferred within their domains against reference libraries of ICP's. This precaution being made to preclude the transmission of an ICP outside of public domain. As electronic commerce expands, the active scrutiny of Internet and Network Service providers suggested herein the preferred embodiment of the present invention may in fact become a requirement to the protection of Intellectual and Copy Written Properties which include programs, running within the electronic landscape but which are not obvious to end users, such as background Java programs.

SUMMARY OF THE INVENTION

Accordingly, several objects and advantages of the present invention include:

(a) improved accountability of consumers to owners of Intellectual and Copy written properties.

(b) improved monitoring of transactions which involve Intellectual and Copy written properties.

(c) a novel distribution structure which promotes commerce.

(d) increased dissemination of the requirements of lawful transference of Intellectual and Copy written properties to consumers (e) facilitation of multiple, or tiered distribution schedules of Intellectual and Copy written properties.

(f) improved distribution of Intellectual and Copy written properties through multiple distributors.

(g) an improved system of collections from consumers for the holders of Intellectual and Copy written properties.

(h) a method for increasing consumer involvement in the proliferation of legally transferable Intellectual and Copy written properties.

(i) a method for expanding the market for individual Intellectual and Copy written properties.

(j) the establishment of transaction code identifiers as a requirement of transferring Intellectual and Copy written properties within the domains of electronic commerce.

(k) the random or static sampling of electronic transfers within electronic domains against the signatures of Intellectual or Copy written Properties.

DESCRIPTION OF THE PREFERRED EMBODIMENTS

Figure 1:
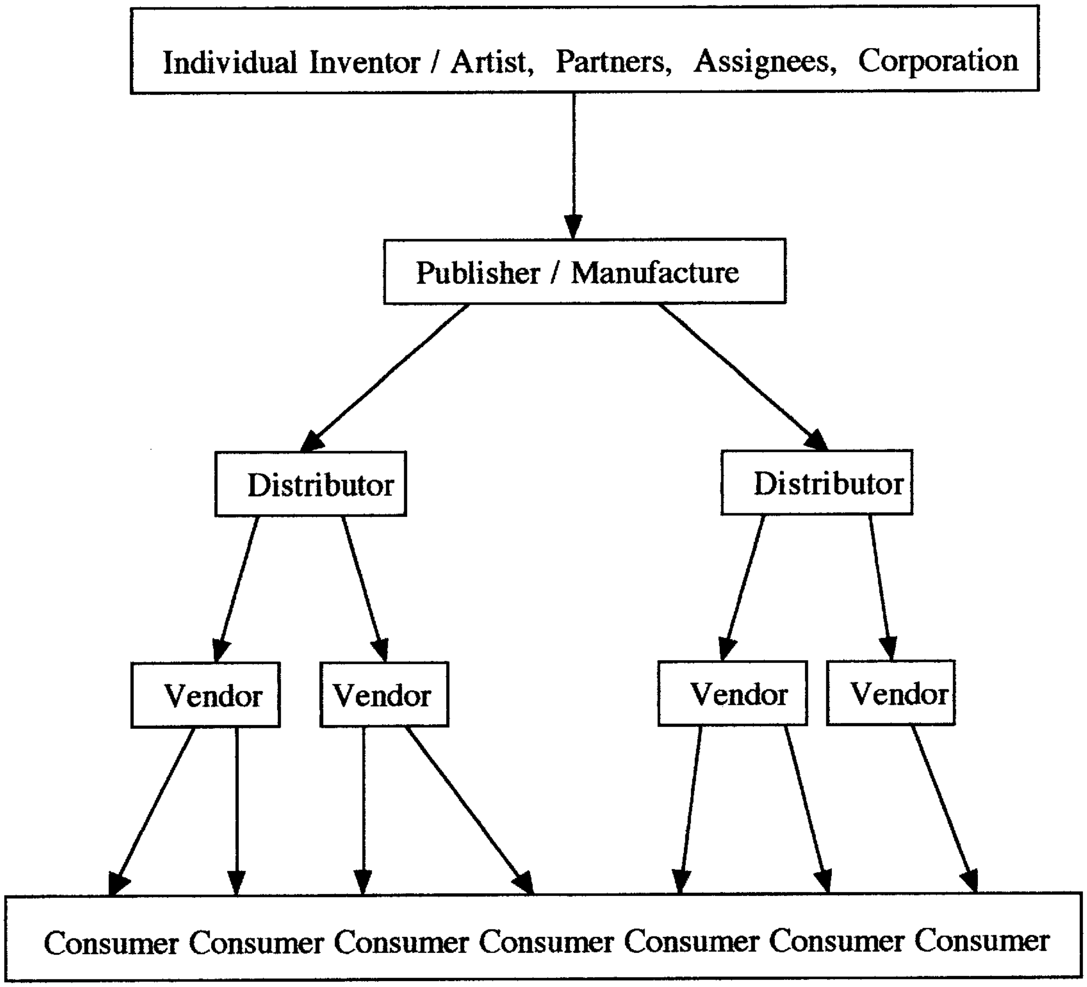
FIG. 1 is a flow chart indicating the prior art distribution channels for Intellectual and Copy written properties.

FIG. 1 shows the methodology in accordance to prior art distribution of Intellectual and Copy written properties. While the topic of discussion is extremely variable in its requirements and history, the basic prior art tenants of distribution are included herein. Traditionally the holders of Intellectual and Copy written properties are regarded as individuals, partners, corporations, and assignees. The transference of said property may be regarded from any aforementioned holder in a linear manner between the above parties, or may further include consumers outside of this assemblage. While the willful transference or licensing of any Intellectual or Copy Written Property may be regarded as an act of commerce, transference beyond the agreement and consent of the property holder is regarded as theft.

Figure 2:
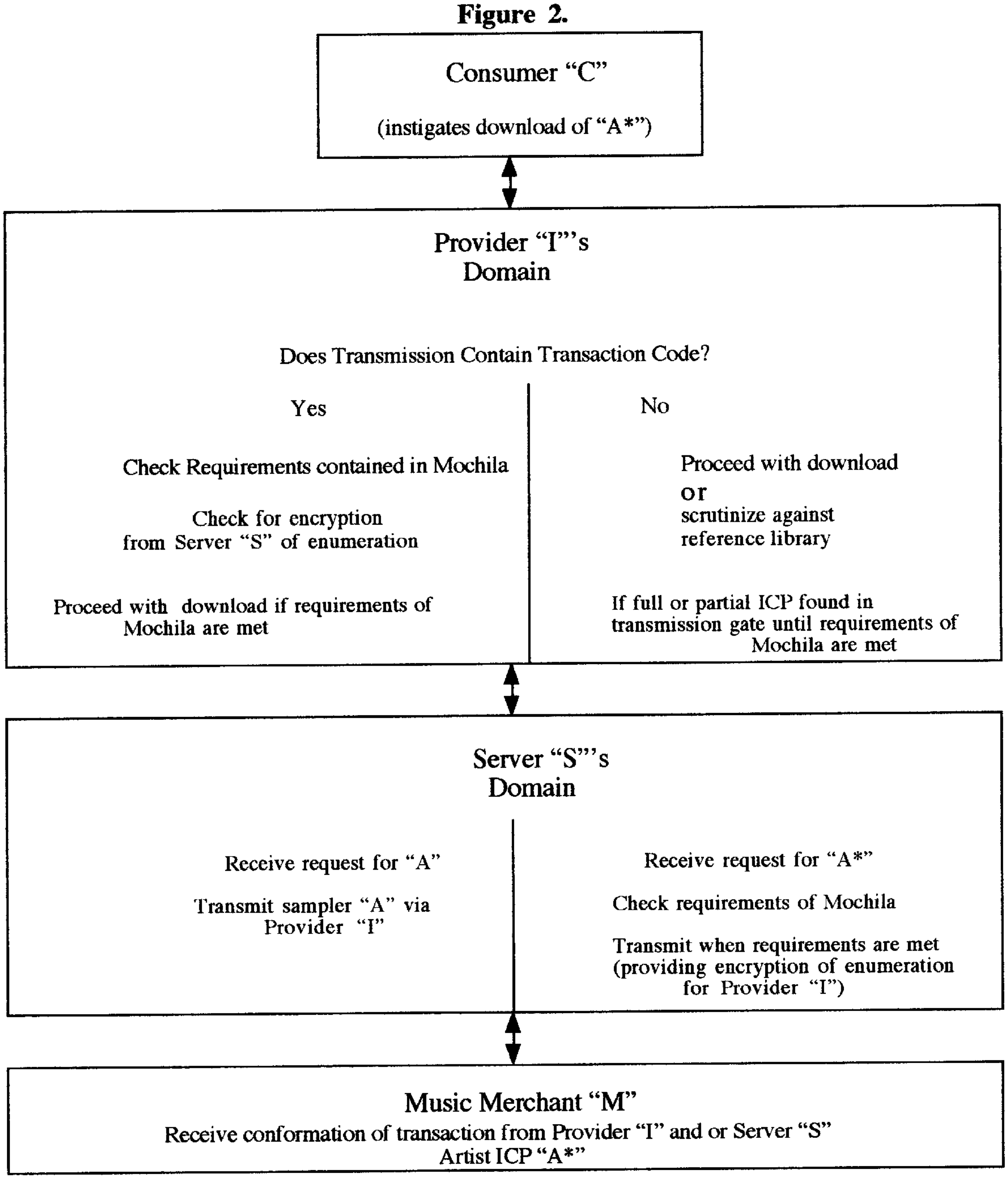
FIG. 2 shows the distribution path of Intellectual and Copy written properties in accordance with the present invention.

Using again the example of copy written music, it is easy to see how multiple copies of a property may currently be transferred electronically via, the Internet without consent or consideration to the property holder, be they an individual, partners, a corporation, or an assignee of a particular property. The present invention serves to prevent trade or transfer of Intellectual or Copy written properties in digital mediums without the consent or deliverance of due consideration to the owner of such property. FIG. 2 illuminates the seed of a novel method of distribution for Intellectual and Copy written properties. While a detailed description of all of the potential acts of commerce embraced under the present invention are too innumerable to detail herein, it is believed that the spirit of the present invention will readily avail itself to those versed in the arts of commerce.

In FIG. 2, consumer "C" decides to shop for some music using a computer, browser and navigation software, a globally based, packet switched type digital telecommunication, cable, or fiber optic infrastructure employing digital networking of Internet Service Providers, routers, Network Service Providers, TCP/IP networking protocol, Internet Product Finding Directors, data synchronizing techniques, Product Information Servers, and further elements of software and structure referred to as the Internet. FIG. 2 further delineates a transaction which occurs after consumer "C" peruses the database of Music Merchant "M". In this instance, "C" logs on with Internet Provider "I", before accessing the library of Music Merchant "M" upon server "S". After having viewed several pages of html code and a sample of a particular artists music "A" transferred as an audio file to Customer "C's" computer via the above mentioned encompassing Internet infrastructure, software programs, and protocols, Customer "C" decides to purchase a copy of audio file "A*". Audio file "A*" is a properly formatted copy of Copy Written Music and as such contains within its TCI all or part of the following information: a copyw designator, and TCI, distinguishing the file as Intellectual or Copy written Property, and therefore unique and bound to restrictions with regard to transfer, ownership, and proliferation; URL code(s), the name of the property holder, the name of the distributor, Trademark Information, the name of the property (song title), the name of the Publisher, descriptive text strings, requirements for purchase or transfer of ownership (or further resources if such transfer may not be accomplished directly over the Internet), product incentive information for further consumer/distributor dissemination, email addresses, further computer information such as a program (applet or Java for example), return form and route for documentation of sale, the name of the Internet Servers and Web Providers involved in the transfer of the file, phone numbers, HTML document(s), the front end of a program such as gopher, Internet domain name('s), the addresses of Web Servers, file type designations (audio), time/date code, FTP information, product update information, further artist information, artist tour dates and promotional material, pass words, music sample "A", warranty and service information, disclaimers, and accommodations for consumer feedback. All of the aforementioned may also be referenced by, as, or to, via single or multiple URL resources. The present invention further accommodates the customization of information contained within the transfer of property so as to be pertinent and valuable to the various requirements of individual transactions. Such information may reside as precursor, or be imbedded by artful manner within the property as is understood by those versed in the art of security. It should be apparent that beyond protecting the TCP holder, the employment of the present invention may also provide customized informational dissemination to the consumer with the intent of further promoting commerce. In the above example the purchaser of file "A*" is able to customize the transaction to include, access to further information upon completion of the sale. The customer may decide to accept no further distraction beyond purchasing the music, or may utilize a password downloaded with the proper copy "A*" to access further TCP material such as a downloadable free music video, or associated promotional artwork.

To facilitate the transaction of music file "A*", consumer "C" places a request to purchase "A*". Server "S" receives the request and derives the requirements of sale from file "A*" or another on site URL. accessible to Server "S". Consumer "C" agrees to the terms described and bundled with file "A*", and makes arrangements with Server "S" to receive enumeration, or gives information to Server "S" granting Server "S" access to enumeration via an account held, and approved by a third party, or server "S" may simply receive encoded conformation that the terms of transfer have been met. Having met the conditions of sale, the file "A*" is initiated for transfer from Server "S" and transferred to the possession of consumer "C", to reside upon the portable device of consumer "C". As the data is transferred from Server "S", it passes through the domain of Internet Provider "I" in route to customer "C". The computer network of Internet Provider "I" recognizes the copyw, or TCI, associated with file "A*" and checks for encryption associated with the file initialized for transfer by Server "S" verifying that the requirements of transfer have already been met, then enables the routing of the transfer bundle through its domain.

Figure 3:
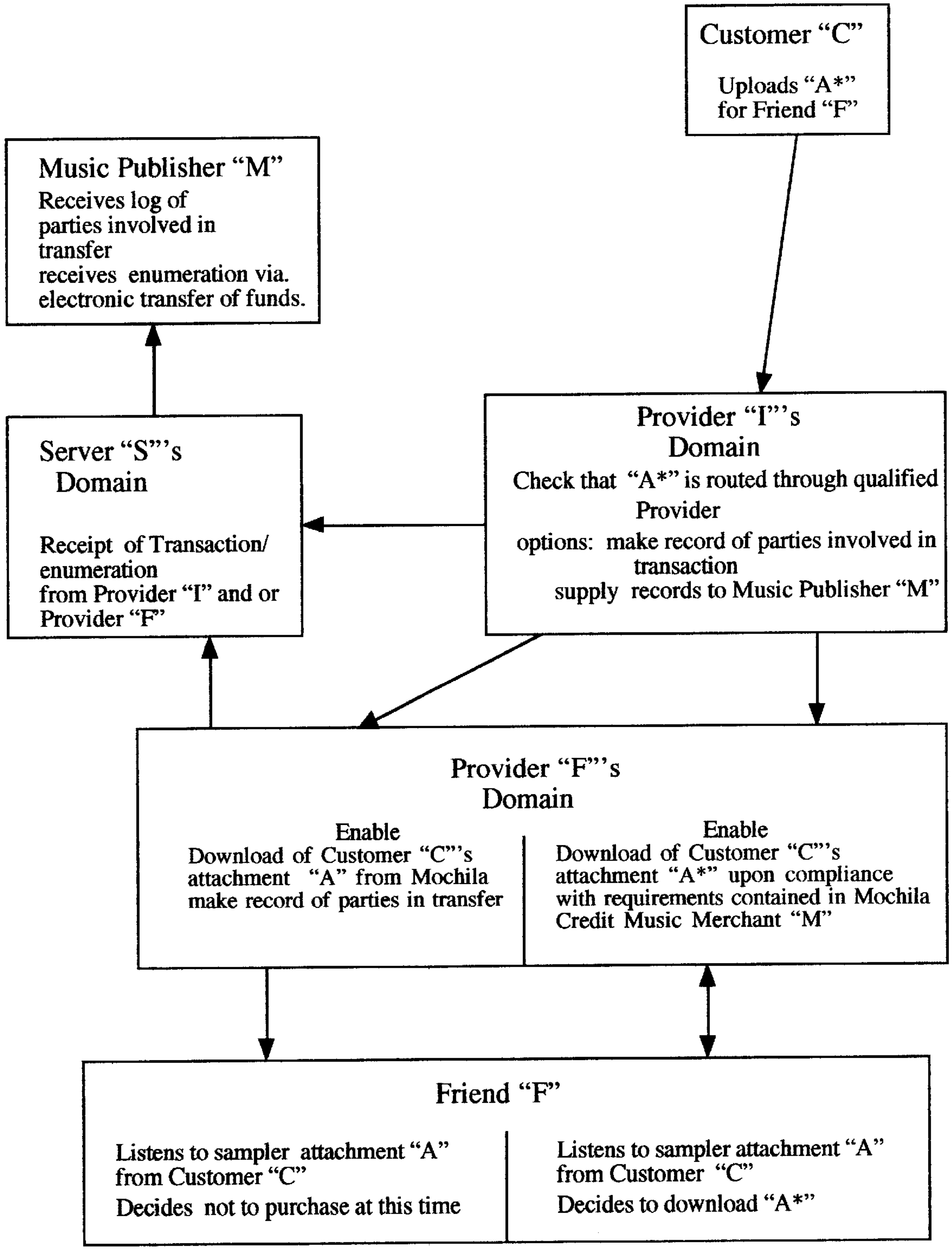
FIG. 3 shows a novel distribution and enumeration method for Intellectual and Copy written Properties in accordance with the present invention.

In FIG. 3 customer "C" is interested in further music from this particular artist, and finds in the downloaded bundle that there are incentives for successful transfers of music file "A*" which originate from customer "C". Customer "C" has several friends who are interested in the latest music and customer "C" emails friends he believes may like the music of Artist "A". Customer "C" sends file "A*" to friend "F" as an attachment to an email, via. Internet Provider "I". Internet Provider "I" recognizes that a copyw, or TCI, has been uploaded within its domain. Internet Provider "I" further realizes that this file is being routed to the Internet Provider "F", and lacking a request for downloading may choose to notate the origin of the file and its destination or simply enable the routing.

As with any attachment, friend "F" may first view his email before deciding to download attachments. In his email to friend "F" customer "C" explains that by purchasing the proper copy from "C" instead of the original distributor, "C" will be given a priority opportunity to purchase concert tickets over the Internet in advance of sales to the general public when the Artist who produced file "A*" announces tour dates. Since customer "C" offers to get friend "F" a good seat as well, Friend "F" decides to give the selection a listen, by hearing the sampler which is attached to file "A*", and detachable as a downloadable attachment requiring no act of commerce ("A"). If friend "F" likes what he hears in the sampler, he decides to become customer "F" by agreeing to the requirements of the purchase. Internet Provider "F" then makes certain that the requirements of transfer for the commercial property are met by either encrypted conformation from a third party that an account controlled by customer "F" has been debited accordingly, or by directly effecting the account already established between customer "F" and Internet Provider "F", before enabling the download of proper copy "A*". Upon successful completion of the transfer of proper copy "A*" from Customer "C" to Customer "F" via Internet providers "F" and or "I", provider "F" transfers an electronic receipt of the transaction and or enumeration to music publisher "M's" server "S", in accordance with the information contained in the copyw/TCI bundle "A*", to be downloaded at the further request of music publisher "M". The receipt indicates the point of origin for the transfer, "C's" email address, and enables customer "C" to be entered into a roster for pre release ticket sales of the artists tour, by placing customer "C's" email address on the roster.

The above presented description of the present invention will not be successful if consumers have concerns regarding their privacy. It is therefore recommended that in the preferred embodiment of the present invention, individuals are allowed the option of lesser involvement in the process of promoting commercial works. In the above example customer "C" should be allowed to present proper copies of file "A*" to acquaintances without further involvement in incentives from publisher "M". Also having accepted the requirements of purchasing the TCP in the above example, both customer "C" and "F" should also be given the option of being added to a mass email list from publisher "M", or selecting to be deleted from any further lists or references in the future.

The present invention has extensive elasticity, and its merits include preclusive adaptability in promoting methods of commerce, which are yet to be established. By way of illustration, there are methods of commerce not yet available, which the present invention will enable. Should organization "Z" decide to enter into the realm of niche marketing by packaging stock market tips, consumer reports, and online news personalized to the interests of individual subscribers, all downloaded to the music of Artist "A", the present invention accommodates the development of "Z" as a distributor of music "A*"; as the distribution of organization "Z's" products develop into a larger presence. "A*" itself contains information regarding levels of distributorship, serves as a method of accounting within digital domains, and insures accountability of both parties living up to terms, regardless of the level of distribution, or how the terms of the agreement change therein. As such the present invention will serve to enable transactions as yet unanticipated in the development of commerce.

Figure 4:
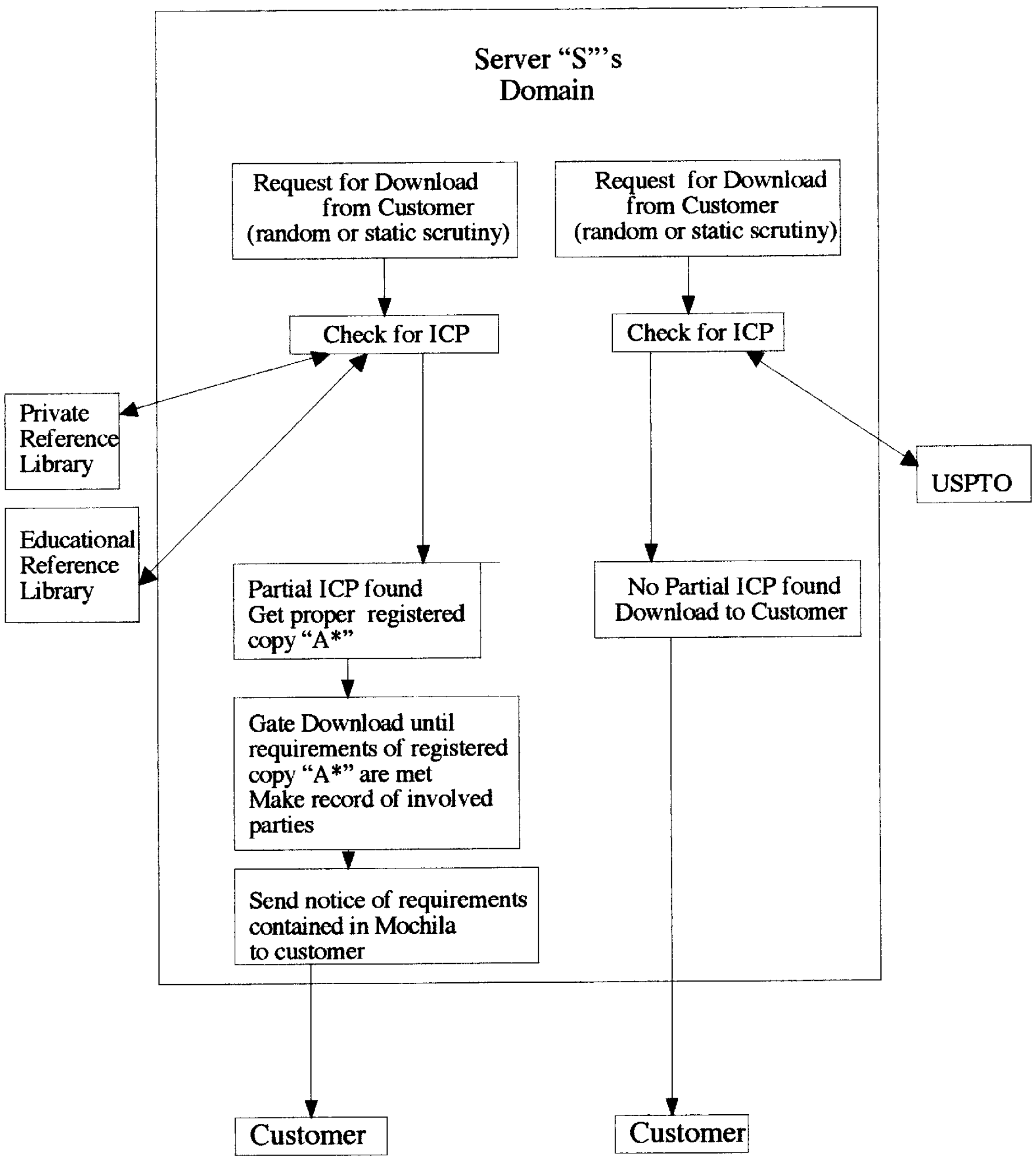
FIG. 4 delineates a technique of sampling the content of an electronic file being transferred over the Internet for Intellectual or Copy written Properties.
Figure 2:
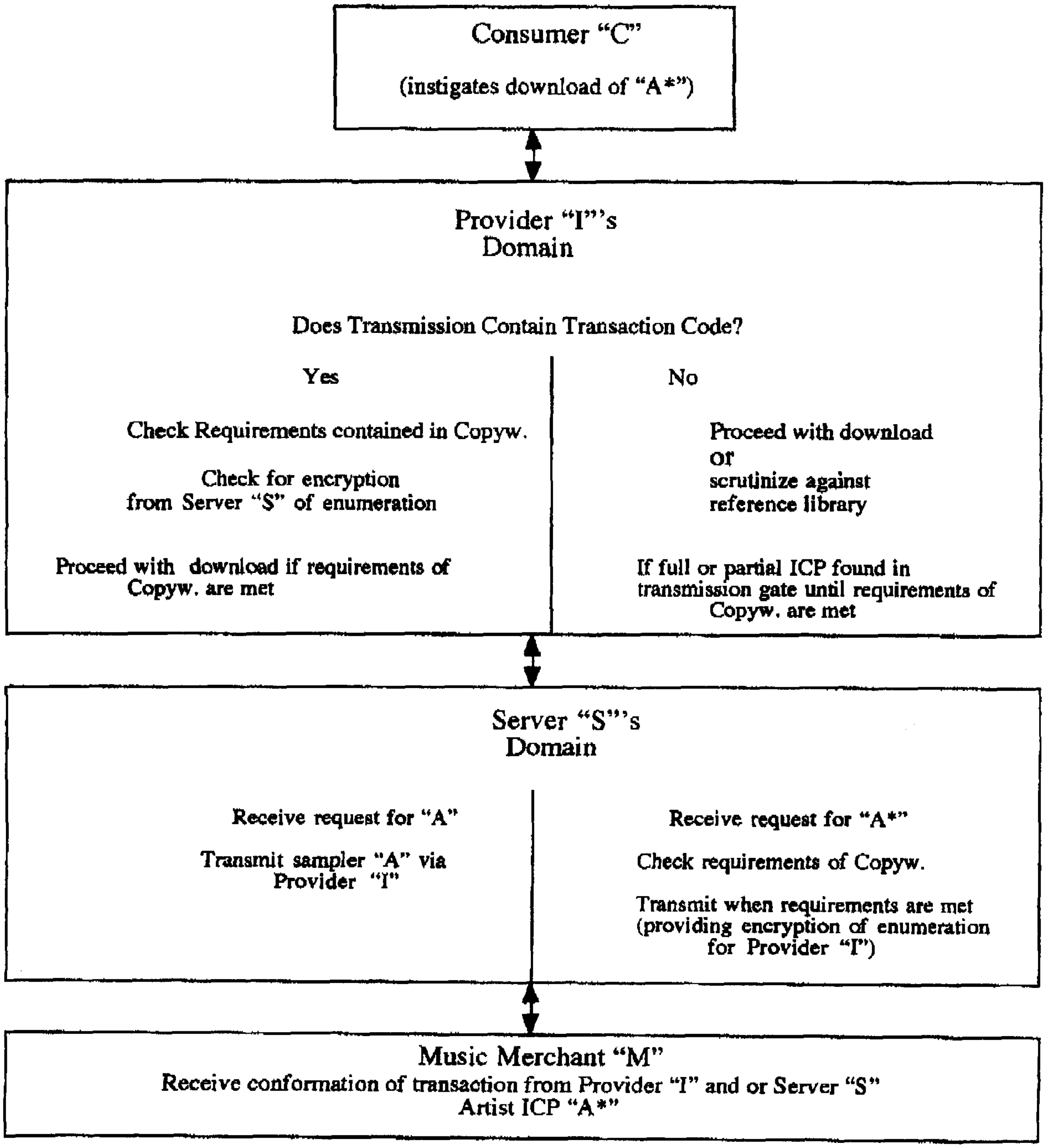
Figure 3:
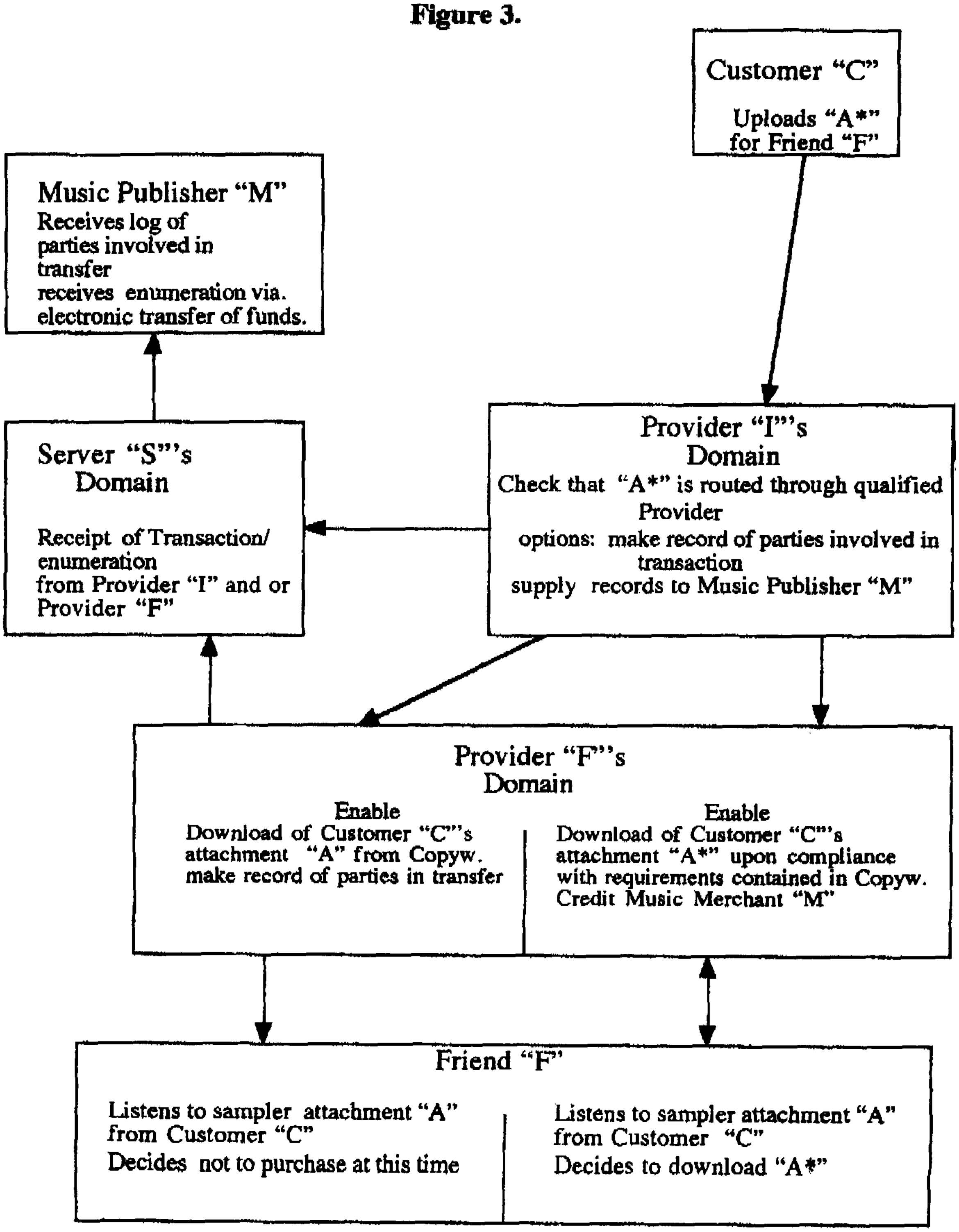
Figure 4:
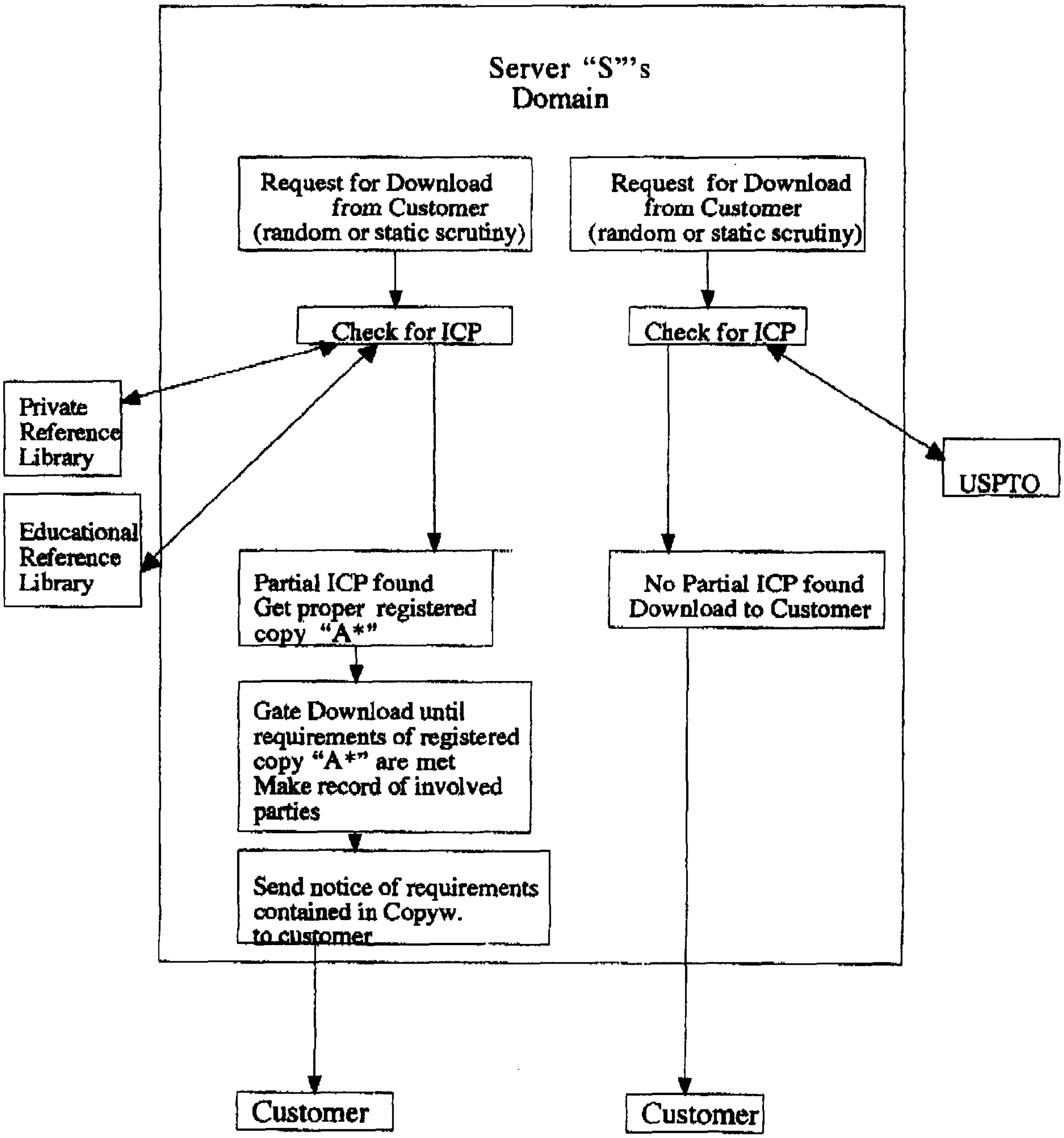

FIG. 4 delineates the employment of libraries against which Internet providers or servers reference electronic data in preparation of transmission within their respective domains. As mentioned earlier ICP's may be made recognizable to programs designed to identify ICP's against libraries of registered ICP's. Every Intellectual or Copy written Property is unique and is in itself a signature which is addressable within the domains of commerce, real and virtual and may be recognizable both part and whole. In the illustration Server "S" randomly samples transmissions before downloading from its domain to consumers portable electronic devices. Should part or all of a transmission be found to contain part or the entirety of an improperly formatted or identified ICP, Server "S" denies the fulfillment of the download to the involved party. Server "S" may then choose to offer a properly formatted copy of the ICP which it has identified to the involved party, or may make record of the parties attempting to effect the download against accountability to the owner of the ICP, or against any legal action with may evolve in the foreseeable future. It should be apparent from the above example that digital servers and providers may establish a level of accountability and degree of concern with regard to facilitating transmission of ICP's between fellow servers and providers, government agencies, and individual consumers; and that sampling techniques employed to identify pirate ICP's may reflect these levels of concern.

Clearly the present invention raises issues of standardization and routing between multiple Service organizations and individuals. However the present invention is fluid enough to accommodate exceptions made between multiple Service Providers, ICP holders and customers in the interest of promoting commerce. The scope of the present invention embraces vast regions of electronic commerce. As such the present inventions ability to adapt to and promote novel forms of commerce and distribution are distinguishing characteristics of the present invention. While the aforementioned delineation is intended to be exemplary, the author believes that multiple adaptions and extensions of the principals herein may be broached without departing from the spirit of the present invention.

What I claim is:

1. A method of controlling the distribution and use of Intellectual and Copyrighted Property within a global digital communication, cable, fiber optic and satellite network having and infrastructure of Network Service Providers, Internet Service Providers, Connectivity Providers, Servers and Routers, said method comprising:

step for generating a Transaction Code Identifier to be used to distinguish digitized content as an Intellectual or Copyrighted Property that is unique and bound to restrictions with regard to transfer, ownership, proliferation and electronic commerce;

step for recognizing the said TCI by a third party Internet Servicing agencies (IS), Internet Providers (IP), Network Providers (NP), Connectivity Providers (CP), Servers, Routers and end user devices whereby:

step for inspecting all the digitized transmissions within the domains of said respective third party IS, IP, NP, CP, Servers Routers and end user devices, for the presence of a TCIs by the said third party IS, IP, NP, CP, Servers, Routers, and end user devices, whereupon;

step for gating said transmission that have been determined to contain said TCIs by the said IS, IP's, NP's, CP, Servers, Routers and end user devices, and further;

step for validating that the legal requirements of transfer, ownership, proliferation and electronic commerce, have been met, by said third party IS, IP's, NP's; CP, Servers, Routers and end user devices; and step for transferring said transmission to the originally intended recipient(s) by said third party IS, IP's, NP's; CP, Servers, Routers and end user devices after the legal requirements of transfer, ownership, proliferation and electronic commerce have been validated.

2. A method according to claim 1 wherein;

step for associating, embedding, or watermarking all or part of said digitized information with generic TCIs within Intellectual or Copyrighted Properties for security purposes, so as to make said Intellectual Property inseparable from said Transaction Code Identifiers; and step for recognizing by third party IS, IP's, NP's, CP, Servers, Routers and end user devices, said generic TCIs; and further step for generating said generic TCIs to be human readable and machine-readable within the header(s) of digital transmissions; and machine-readable, as watermarked, or embedded within said Intellectual or Copyrighted Properties, whereby;

step for providing Intellectual and Copyright Property Management Protection notification to third party Internet servicing agencies, Internet Providers, Network Providers, Connectivity Providers, Servers, Routers and end user devices, by the recognition of the said generic Transaction Code Identifiers, as said generic TCI information is transferred to and from said originally intended recipient(s).

3. A method according to claim 2 wherein:

step for assigning a property specific TCIs to all or part of said digitized information consisting of property specific digitized information in the interests of third party property holders, including: URL code(s), the name of the property holder, the name of the distributor, Trademark Information, the name of the property (song title), the name of the Publisher, descriptive text strings, requirements for purchase or transfer of ownership (or further resources if such transfer may not be accomplished directly over the Internet), product incentive information for further consumer I distributor dissemination, email addresses, further computer information such as computer programs, return forms and routes for documentation of sales, the address of the third party Internet Servicing Agencies, Internet Providers, Network Providers, Connectivity Providers, Servers, and end user devices involved in the transfer of the files, phone numbers, HTML documents, the front end of a program such as gopher, Internet domain names, the addresses of Web Servers, file type designations (audio), time I date code, FTP information, product update information, further artist information, artist tour dates and promotional material, pass words, music samples, warranty and service information, disclaimers, accommodations for consumer feedback, and Internet protocols provided specifically for Property Rights Management, wherein, step for associating, embedding, or watermarking within Intellectual and Copyrighted Properties for security purposes, said property specific TCIs so as to make said ICP inseparable from said property specific TCIs;

step for making said property specific TCIs recognizable by third party IS, IP's, NP's, CP, Servers, Routers, and end user devices, wherein;

step for making said TCIs machine readable in transmission and human readable as displayed within the headers of IP addresses, and html documents, whereby;

step for notification to third party IS, JP's, NP's, CP, Servers, Routers, and end user devices, as said property specific TCIs are transferred to and from said originally intended recipient(s) as provided by said property specific TCIs.

4. A method according to claim 2, wherein;

the step of presenting the requirements of transfer sale, and proliferation, as delineated within said property specific TCI's to the originally intended recipient(s) of said transmissions, by the said third party IS, IP's, NP's, CP, Servers, Routers, and end user devices before the step of transferring said transmissions within said domains of the said third party IS, IP's, NP's, CP, Servers, Routers, and end user devices, to the originally intended recipient(s) of said transmissions.

5. A method according to claim 1 wherein:

step of inspecting digitized transmissions within the respective domains of the said third party IS, IP's, NP's, CP, Servers, Routers, and end user devices, to determine if said transmissions contain Intellectual or Copyrighted property, which has been stripped of TCI information; and further step of comparing the content of digitized transmissions within their respective domains against libraries of registered ICPs by the said third party IS, IP's, NP's, CP, Servers, Routers, and end user devices; wherein the step of the said third party IS, IP's, NP's, CP, Servers, Routers, and end user devices either;

a) forward the requirements of sale as delineated by said libraries of registered ICPs, to the originally intended recipient, b) accept a responsible third party has met assurance that the requirements of sale as delineated by said libraries of registered ICPs, c) consummates the requirements of sale as delineated by said libraries of registered ICPs.

6. A computer program for implementing the method of;

distinguishing digitized content as an Intellectual or Copyrighted Property;

recognizing the said TCI by a third party Internet Servicing agencies (IS), Internet Providers (IP's), Network Providers (NF's), Connectivity Providers (CP), Servers, Routers, and end user devices, whereby:

inspecting all digitized transmissions within the domains of said respective third party IS, IP's, NF's, GP's, Servers, Routers, and end, user devices, by the said third party IS, IP's, NP's, CF's, Servers, routers, and end user devices for the presence of a TCI; whereupon gating said transmission, determined to contain said TCI by said IS, IP's, NP's, CP, Servers, Routers, and end user devices, gate; and further, said third party IS, IP's, NP's, CP, Servers, pouters, and end user devices, either;

a) determine the legal requirements of transfer, ownership, proliferation and electronic commerce by examining property specific information within the TCI, b) determine the legal requirements of transfer, ownership, proliferation and electronic commerce by comparing property specific information within the TCI, against libraries of registered ICPs, c) forward the legal requirements of transfer, ownership, proliferation and electronic commerce as determined by a), b), to the originally intended recipient, d) validate, that the legal requirements of transfer, ownership, proliferation and electronic commerce, have been met, before transferring said transmission to the originally intended recipient, e) receive verification that the legal requirements of transfer, ownership, proliferation and electronic commerce, have been met by a responsible third party, before transferring said transmission to the originally intended recipient, e) accept payment on behalf of third party Intellectual or Copyrighted Property holders, to consummate the legal requirements of transfer, ownership, proliferation and electronic commerce, before transferring said transmission to the originally intended recipient(s).

7. A computer program according to 6 further comprising:

generating said generic TCI information that is human and machine-readable within the header(s) of digital transmissions, and machine-readable, as watermarked, or embedded within said Intellectual or Copyrighted Properties, and further;

associating, embedding or watermarking the said generic TCIs within the Intellectual or Copyrighted Properties for security purposes, so as to make said Intellectual Properties inseparable from said TCIs;

making the said generic TCIs recognizable by said third party IS, IP's, NP's, CP, Servers, Routers, and end users, and further making said generic TCIs being recognizable as presented to end user devices as said transmissions are transferred to and from originally intended recipient(s).

8. A computer program according to claim 6 further comprising;

generating property specific TCIs that are machine-readable, as watermarked, or embedded within said Intellectual or Copyrighted Properties, and further;

associating, embedding, or watermarking all or part of said digitized information with generic TCIs within Intellectual or Copyrighted Properties for security purposes, so as to make said Intellectual Property inseparable from said Transaction Code Identifiers; and recognizing by third party IS, IP's, NP's, CP, Servers, Routers and end user devices, said property generic TCIs.

9. A computer program according to claim 8 further comprising;

gating the transmission of said data files found to be Intellectual or Copyrighted Properties, by the said Internet Providers, Network Providers, Connectivity Providers, Routers and end user devices and Servers, presenting the requirements of sale or proliferation of particular Intellectual and Copyrighted Properties to the addressee of said data file as referenced against digital libraries containing the legal requirements of record in regard to electronic commerce associated with individual Intellectual or Copyrighted Properties.

10. A computer program according to claim 9 wherein;

transferring said IPC upon compliance of the said addressee to render compensation in accordance with the requirements of said legal transfer of ownership or proliferation of an individual Intellectual and Copyrighted Property, by said Internet Providers, Network Providers, Connectivity Providers, Routers, end user devices and Servers.

11. A system for controlling the distribution and use of Intellectual and Copyrighted Property within a global digital communication, cable, fiber optic and satellite network having an infrastructure of Network Service Providers, Internet Service Providers, Connectivity Providers, Servers, and Routers, said system containing:

means for rendering ICP recognizable to third party Network Service providers, Internet Service Providers, Connectivity Providers, Routers, end user devices and Servers by the use of TCI;

means for associating or embedding the said TCI into said Intellectual or Copyrighted Property;

means for establishing said Intellectual or Copyrighted Property as unique and bound to restrictions with regard to transfer, ownership, proliferation and electronic commerce;

means for making the TCI human and machine-readable within the header(s) of digital transmissions, and machine-readable, as embedded within said properties; further means for inspecting all transmissions within the respective domains of the said Internet Service Providers, Network Service Providers, Connectivity Providers, Servers, end user devices, and Routers for the presence of said Transaction Code Identifiers;

means for halting transmissions determined to contain TCI identifiers.

12. A system according to claim 11 wherein;

means for promoting authorized peer-to-peer distribution within digital media by including or bundling said TCI into digital files bearing the requirements to satisfy said restrictions for each individual Intellectual or Copyrighted Property with regard to transfer, ownership, proliferation and electronic commerce.

13. A system according to claim 12 wherein;

means for electing to by said Network Service providers, Internet Service Providers, Connectivity Providers, Routers and Servers to discretely sample data bundles within their respective domains against libraries of ICP:

means for gating the downloading or transference of data files which contain all or part of any individual Intellectual or Copyrighted Property in accordance with the protection of said Intellectual or Copyrighted Properties.

14. A method for controlling the distribution and use of Intellectual and Copyrighted Property within a global digital communication, cable, fiber optic and satellite network having an infrastructure of Network Service Providers, Internet Service Providers, Connectivity Providers, Servers, and Routers, said method comprising:

step for transmitting Intellectual and Copyrighted Property within a global digital communication, cable, fiber optic and satellite network having an infrastructure of Network Service Providers, Internet Service Providers, Connectivity Providers, Servers, and Routers;

step for associating and embedding the Intellectual and Copyrighted Property with a Transaction Code Identifier to identify said ICP as unique and bound to restrictions;

step for establishing the restrictions of the ICP that specify transfer, ownership, proliferation, and electronic commerce requirements;

step for creating the TCI that is human and machine-readable within the header(s) of digital transmission, and machine-readable, as watermarked or, embedded within said properties, wherein;

step for inspecting all the Intellectual and Copyrighted Property in transfer within the respective domains of the said Network Service Providers, Internet Service Providers, Connectivity Providers, Servers, and Routers, and further:

step for automatically triggering said Network Service Providers, Internet Service Providers, Connectivity Providers, Servers, and Routers to gate transmission containing said TCI and;

step for presenting the legal requirements of transfer, ownership, proliferation and electronic commerce to the intended recipient(s) of said ICP in transfer, as determined by either:

a) property specific TCI information watermarked, embedded or associated with said digitized information in transfer, b) confirming said legal requirements of transfer, ownership, proliferation and electronic commerce from digital reference libraries of ICP(s), by the said Network Service Providers, Internet Service Providers, Connectivity Providers, Servers, and Routers;

step for verifying that the legal requirements of transfer, ownership, proliferation and electronic commerce, for said ICP in transfer from the respective domains of said Network Service Providers, Internet Service Providers, Connectivity Providers, Servers, and Routers is done by the said Network Service Providers, Internet Service Providers, Connectivity Providers, Servers, and Routers;

step for releasing and transmitting, said ICP in transfer to the respective Network Service Providers, Internet Service Providers, Connectivity Providers, Servers, and Routers after the legal requirements of transfer, ownership, proliferation and electronic commerce for said ICP in transfer from the respective domains of said Network Service Providers, Internet Service Providers, Connectivity Providers, Servers, and Routers has been verified and confirmed as satisfying the legal requirements of transfer, ownership, proliferation and electronic commerce for said ICP in transfer from the respective domains of said Network Service Providers, Internet Service Providers, Connectivity Providers, Servers, and Routers.

15. A method according to claim 14 further comprising;

step for including or bundling the said Transaction Code Identifiers with the digital files bearing the requirements to satisfy said restrictions with regard to transfer, ownership, proliferation and electronic commerce for said unique Intellectual or Copyrighted Property(s).

16. A method according to claim 15 further comprising;

step for gating said transmission or transfer of ICP within the Network Service Providers, Internet Service Providers, Connectivity Providers, Routers and Servers domains, until the requirements of individual Intellectual or Copyrighted Properties as specified by said Transaction Code Identifiers and or further said digital files bundled with said Intellectual or Copy Written Property are met.

17. A method according to claim 15 further comprising;

step for enabling a novel distribution of said Intellectual or Copyrighted Property between individual parties;

step for making individual parties accountable to the owner of said Intellectual or Copyrighted Property by third party Network Service Providers, Internet Service Providers, Connectivity Providers and Servers.

step for associating or embedding said Transaction Code Identifiers into data bundles that include requirements to satisfy said restrictions for each individual Intellectual or Copyrighted Property with regard to transfer, ownership, proliferation and electronic commerce.

18. A method according to claim 17 further comprising;

step for permitting the transference of said Intellectual or Copyrighted Properties, step for recognizing that the transfer of real property, or legal tender, has occurred in a binding manner to the effect of satisfying the commerce requirements of an Individual Intellectual or Copyrighted Property by the said Network Service Providers, Internet Service Providers, Connectivity Providers, and Servers;

step for permitting the transference of said ICP by said Network Service Providers, Internet Service Providers, Connectivity Providers, and Servers.

19. A method according to claim 18 further comprising;

step for fulfilling the transfer of real property, or legal tender, in a binding manner to the effect of satisfying the commerce requirements of Intellectual or Copyrighted Properties, by the said Network Service Providers, Internet Service Providers, Connectivity Providers, and Servers, in accordance with information provided within said Transaction Code Identifier, and or said associated data bundle, as said Intellectual or Copyrighted Properties are transferred within, or through the domains of said Network Service Providers, Internet Service Providers, Connectivity Providers, and Servers.

* * * * *

UNITED STATES PATENT AND TRADEMARK OFFICE

CERTIFICATE OF CORRECTION

PATENT NO. : 6,947,909 B1
APPLICATION NO. : 09/569388
DATED : September 20, 2005
INVENTOR(S) : Clare L. Hoke, Jr.

It is certified that error appears in the above-identified patent and that said Letters Patent is hereby corrected as shown below:

The sheet of drawings, consisting of figures 2-4 should be deleted to appear as per attached figures 2-4.

Column 4, page 59, replace “established” --establish--
Column 11, line 47, remove “I”
Column 11, line 57, remove “I”
Column 12, line 7, replace “JP’s” with --IP’s--.
Column 12, line 41, after “ICPs,” insert --are met--
Column 12, line 47, replace “the said TCI” with, --Transaction Code Identifiers (TCI)--
Column 12, line 47, remove “a”
Column 12, line 49, replace “(NF’s)” with, --(NP’s)--
Column 12, line 52, replace “NF’s, GP’s” with, --NP’s, CP’s--
Column 12, line 54, replace “CF’s” with --CP’s--
Column 12, line 59, replace “pouters” with, --Routers--
Column 13, line 2, replace “ICPs” with, --Intellectual or Copyrighted Propertys (ICP’s)--
Column 13, line 21, remove “said”
Column 13, line 48, after “property”, insert --specific and--
Column 14, line 1, after “said” insert, --Internet Servicing agencies--
Column 14, line 10, replace “ICP” with, --Intellectual or Copyrighted Propertys (ICP’s)--
Column 14, line 13, replace “TCI” with, --Transaction Code Identifiers (TCI)--

Signed and Sealed this

Tenth Day of October, 2006

JON W. DUDAS
*Director of the United States Patent and Trademark Office*